United States Patent
Campau

(10) Patent No.: US 8,439,616 B2
(45) Date of Patent: May 14, 2013

(54) LOCKING THREADED FASTENER

(75) Inventor: Daniel N. Campau, Ada, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 137 days.

(21) Appl. No.: 13/113,357

(22) Filed: May 23, 2011

(65) Prior Publication Data

US 2012/0301247 A1    Nov. 29, 2012

(51) Int. Cl.
   *F16B 37/12*    (2006.01)
(52) U.S. Cl.
   USPC ............................................... 411/251
(58) Field of Classification Search .......... 411/250–252, 411/262
   See application file for complete search history.

(56) References Cited

U.S. PATENT DOCUMENTS

| | | | |
|---|---|---|---|
| 152,249 A | 6/1874 | Penfield | |
| 422,027 A | 2/1890 | Marshall | |
| 900,589 A | 10/1908 | Ratcliffe | |
| 988,911 A | 4/1911 | Terry | |
| 1,081,965 A | 12/1913 | Kester | |
| 1,179,446 A | 4/1916 | Mennie | |
| 1,267,656 A | 5/1918 | Goserud | |
| 1,440,324 A | 12/1922 | Whitaker | |
| 1,630,958 A | 5/1927 | Mauch | |
| 1,830,918 A * | 11/1931 | Sundh | ............................ 411/251 |
| 1,830,919 A | 11/1931 | Sundh | |
| 1,830,920 A | 11/1931 | Sundh | |
| 1,909,400 A * | 5/1933 | Hall | ............................ 411/262 |
| 1,929,169 A | 10/1933 | Hall | |
| 2,233,889 A | 3/1941 | Hood | |
| 2,562,621 A | 7/1951 | Larson | |
| 2,587,560 A | 2/1952 | Widmer | |
| 3,391,720 A | 7/1968 | Morse | |
| 3,565,149 A | 2/1971 | Wetzel | |
| 3,589,423 A | 6/1971 | Metz | |
| 3,701,372 A | 10/1972 | Breed | |
| 4,069,855 A | 1/1978 | Petroshanoff | |
| 4,983,085 A | 1/1991 | Gray | |
| 5,449,259 A | 9/1995 | Clohessey | |

(Continued)

FOREIGN PATENT DOCUMENTS

| | | |
|---|---|---|
| AT | 375452 | 8/1984 |
| EP | 1760334 | 3/2007 |

(Continued)

OTHER PUBLICATIONS

International Search Report and Written Opinion for International Application No. PCT/US2011/049254, mailed Oct. 28, 2011.

(Continued)

*Primary Examiner* — Flemming Saether
(74) *Attorney, Agent, or Firm* — Warner Norcross & Judd LLP

(57) ABSTRACT

A locking fastener includes a fastener body and a locking band. The body includes a tangential slot. The locking band includes a coil portion and first and second tangs extending tangentially from the coil portion. The first tang extends into the slot to limit angular movement of the first tang with respect to the body. When the locking fastener is turned in a loosening direction with sufficient torque, the second tang contacts the fastener body to open the coil portion and to allow removal of the locking fastener.

6 Claims, 2 Drawing Sheets

U.S. PATENT DOCUMENTS

| | | | |
|---|---|---|---|
| 5,529,348 | A | 6/1996 | Wasserman et al. |
| 6,015,251 | A | 1/2000 | Chung |
| 2009/0095359 | A1 | 4/2009 | Campau |
| 2009/0097940 | A1 | 4/2009 | Campau |
| 2010/0266364 | A1 | 10/2010 | Campau |
| 2012/0301246 | A1* | 11/2012 | Campau ........................ 411/252 |

FOREIGN PATENT DOCUMENTS

| | | |
|---|---|---|
| FR | 1377030 | 10/1964 |
| FR | 2544030 | 10/1984 |
| GB | 04780 | 0/1909 |
| GB | 221456 | 9/1924 |

OTHER PUBLICATIONS

United States Statutory Invention Registration No. H1588, published Sep. 3, 1996, entitled "Helical Spring Fastener".

U.S. Appl. No. 12/880,580, filed Sep. 13, 2010, entitled "Locking Threaded Fastener".

International Search Report and Written Opinion for International Application No. PCT/US2008/076155, mailed Dec. 19, 2008.

International Search Report and Written Opinion for International Application No. PCT/US2010/026196, mailed May 31, 2010.

International Search Report and Written Opinion for International Application No. PCT/US2012/037183, mailed Aug. 6, 2012.

* cited by examiner

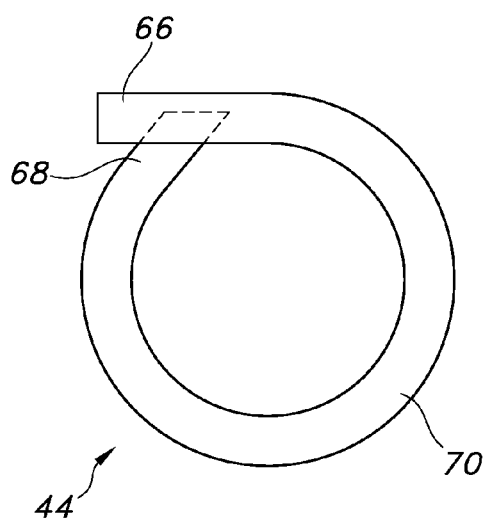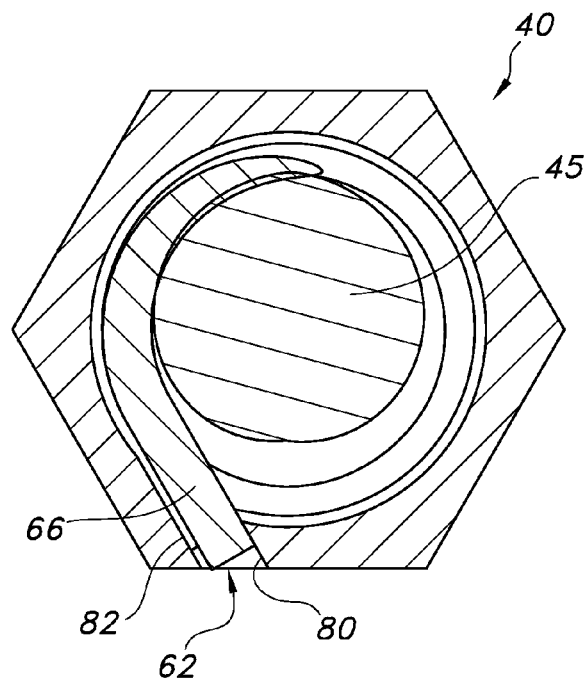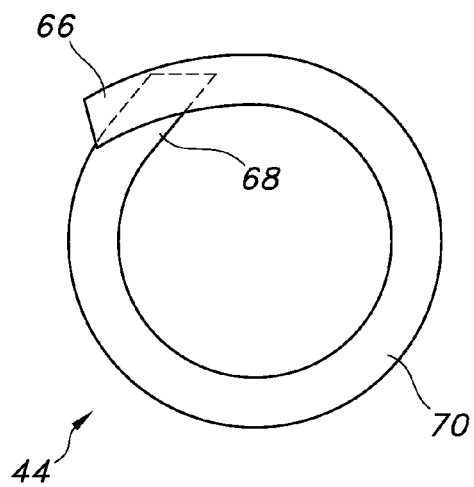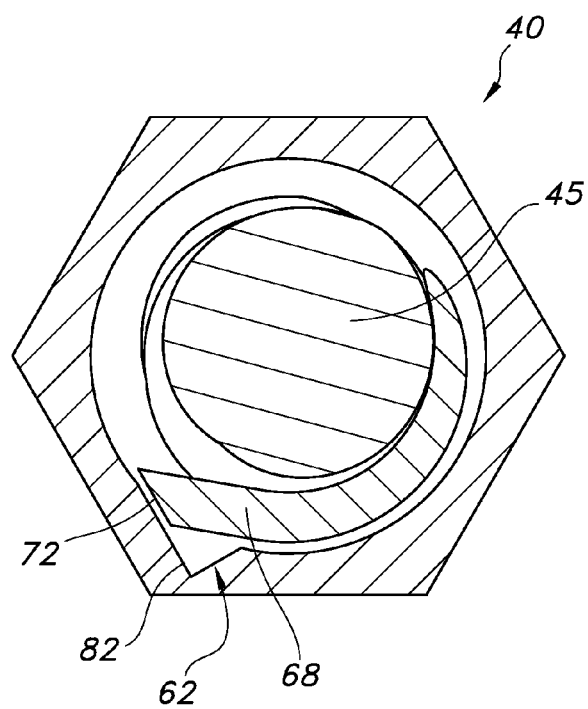
FIG. 4
FIG. 6
FIG. 5
FIG. 7

LOCKING THREADED FASTENER

BACKGROUND OF THE INVENTION

The present invention relates to locking threaded fasteners, and more particularly to lock nuts that include a coil or a band as a one-way locking element.

Lock nuts can include a coil or a band as a one-way locking element. Typically, the locking element has one end bent radially outwardly and anchored to the nut, typically nested in a close fitting slot in the nut. Under loosening torque, this anchoring method results in a tension load in the locking element that causes the element to tighten its grip on the external thread to prevent relative rotation (loosening) between the nut and external thread. The opposite force, compression, is exerted on the locking element during installation. This force causes the locking element to loosen its grip on the external thread so that there is relatively low installation torque.

This locking system typically require special means to enable removal of the nut from the external thread. However, at least one lock nut does not require special means as disclosed in U.S. application Ser. No. 12/880,580 filed Sep. 13, 2010. That lock nut includes a locking element that slips at a controlled removal torque, simplifying the construction of the nut by eliminating special release rings.

The described lock nuts have not gained widespread adoption perhaps because either the complexity, and therefore cost, is too high or the performance is not comparable to competitive technologies. One performance challenge is related to the manner in which locking elements have been anchored to the nuts. The radial tang experiences high reaction loads when removal torque is applied to the nut. Even if the locking element is designed with a strong cross-section, such as a rectangular wire band as disclosed in the '580 application, there can be high stress on the external thread adjacent the anchored tang. This high stress causes excessive wear on the external thread, especially if the locking element is stainless steel, and increases friction between the band and the external thread. The friction can cause the slip torque to rise above the strength limit of the band, resulting in fracture or permanent set of the band. This prevents reuse of the nut.

SUMMARY OF THE INVENTION

The disclosed locking nut includes a locking element that addresses the shortcomings of the above noted lock nuts. The new lock nut maintains the simplicity of the above noted lock nuts, while addressing the shortcomings. Consequently, the new lock nut provides an improved balance of simplicity, cost, and performance.

According to a first aspect of the invention, the lock nut includes a nut body and a locking element. The locking element includes a coil portion and two tangs or ends extending tangentially from the coil portion. The first tang is anchored to the nut body to prevent angular movement of the first tang with respect to the body. The second tang is dimensioned to engage the nut body during removal, but not during installation.

According to a second aspect of the invention, the locking element is located within a pocket or recess in the nut body, and the first tang is located within a tangential slot in the nut body. The locking element and the recess are dimensioned so that the second tang comes into contact with the wall of the recess when sufficient removal torque is applied to the nut body of the fastener. This contact reduces increased stress on the locking element, which allows the locking fastener to be removed without permanent damage to the locking band.

These and other advantages and features of the invention will be more fully understood and appreciated by reference to the description of the current embodiments and the drawings.

BRIEF DESCRIPTION OF THE DRAWINGS

FIG. 4 is a top view of the locking element included in the fastener.

FIG. 5 is a top view of the locking element of FIG. 4 during loosening of the fastener.

FIG. 6 is a sectional view taken along the line 6-6 in FIG. 3.

FIG. 7 is a sectional view taken along the line 7-7 in FIG. 3.

DESCRIPTION OF THE CURRENT EMBODIMENT

Figure 1:
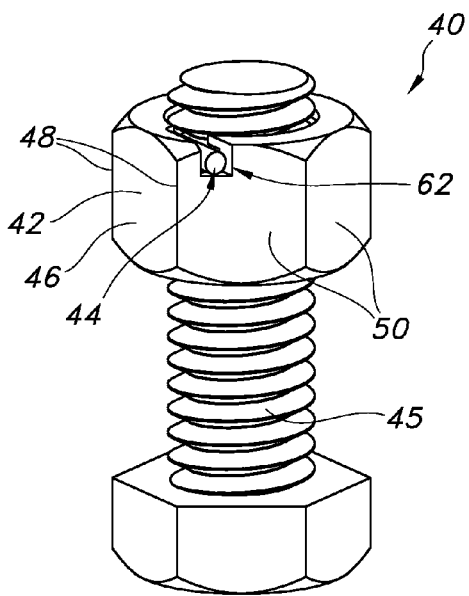
FIG. 1 is a perspective view of the current embodiment of the locking fastener.
Figure 2:
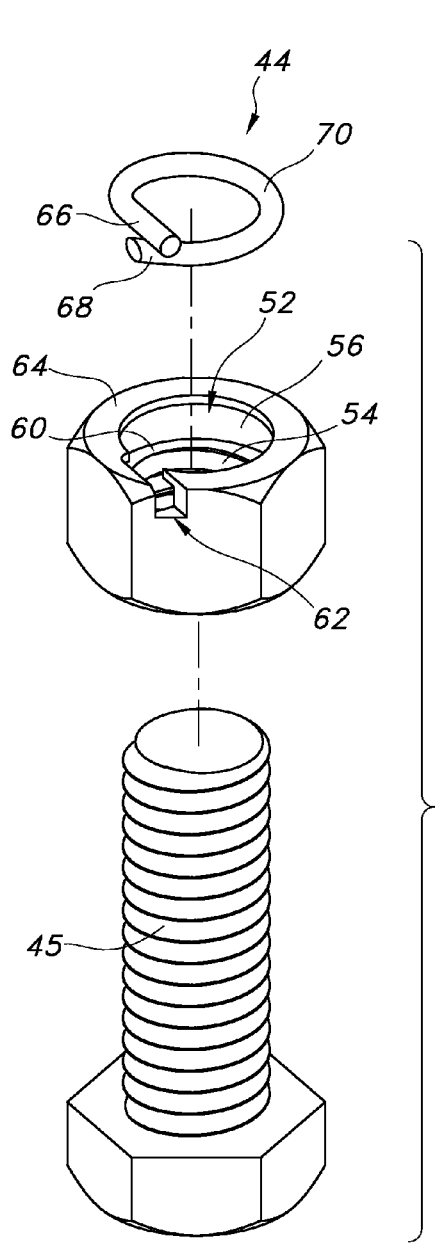
FIG. 2 is a perspective exploded view of the fastener.
Figure 3:
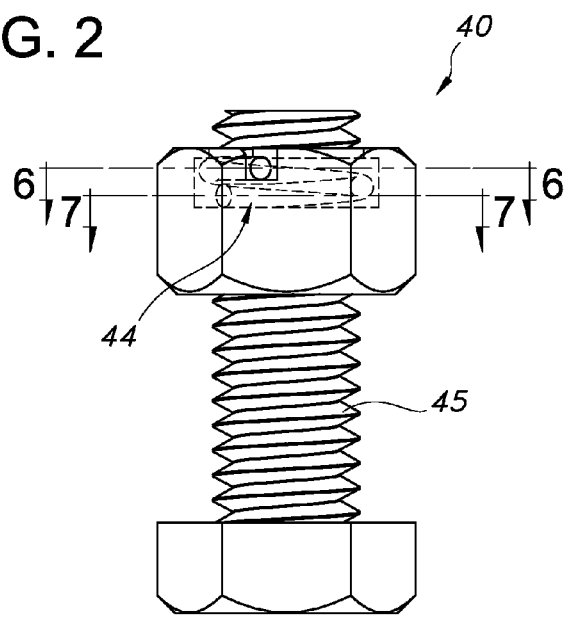
FIG. 3 is a side view of the fastener.

A locking fastener constructed in accordance with the current embodiment of the invention is illustrated in FIGS. 1-7 and generally designated 40. Though shown in FIGS. 1-7 as a retaining nut or a lock nut, the concepts of the present invention can be incorporated into a variety of fasteners as well be recognized by those skilled in the art.

The threaded fastener 40 includes a body 42 and a locking band 44. The body 42 includes a hex-shaped outer portion 46 configured to be engaged and driven by a conventional driving tool (not shown). The hex-shaped portion 46 includes a plurality of corners 48 and a plurality of flats 50 extending therebetween. Alternatively, the body 42 may be square or any other polygonal shape. The body 42 may also be shaped to be engaged by any conventional driving tool, now known or later developed.

The body 42 defines a bore 52, which is at least partially threaded along its length. As perhaps best shown in FIG. 2, the bore 52 includes a first portion 54 that is threaded and a second portion, pocket, or recess 56 that is unthreaded. The diameter of the unthreaded portion 56 is greater than the diameter of the threaded portion 54. A shoulder 60 separates the first and second portions 54, 56.

The body further defines a tangential recess or slot 62 communicating with the recess 56 and opening through an axial end portion 64 of the body 42. Although the current slot is exposed, the slot may be defined in an interior of the body 42.

The locking band 44 includes a coil or continuously curved portion 70 having a circular cross-section extending between a first tang or end portion 66 and a second tang or end portion 68. Though illustrated with a circular cross-section, other cross-sectional shapes are contemplated including square, rectangular, oval, triangular and any other suitable shape.

In the current embodiment, the first and second tangs or end portions 66, 68 are straight, but other shapes, including smooth curves and angles, are also contemplated. Perhaps as best shown in FIG. 4, both tangs 66, 68 extend tangentially outward from the curved portion 70. Also as shown in FIG. 4, the locking band 44 may include a single turn, with the first tang 66 overlapping the second tang 68. The locking band 44 may alternatively include less than a single turn, or two or more helical turns so that adjacent turns. If the locking band 44 includes less than a single turn, the locking band 44 may extend entirely within a single plane oriented perpendicular to the bore 52, or may extend helically.

The diameter of the circular cross-section of illustrated locking band 44 generally corresponds to the pitch of the externally threaded member 45 so that the locking band 44 may be nested within the threads of the threaded member 45. In a locking band with a non-circular cross-section, the dimension of the surface engaging the threads of the threaded member 45 may be less than, generally the same as, or greater than the pitch of the threaded member.

The tangentially-extending tang 66 is received and constrained within the slot 62 in the fastener body 42. As shown in FIG. 6, the slot 62 has an interior wall 80 and an exterior wall 82 that constrain the angular movement of first tang 66 relative to the body 42. For example, during rotation in an installation or clockwise direction, a side surface of first tang 66 may contact interior wall 80; and, during rotation in a removal or counterclockwise direction, a side surface of first tang 66 may contact exterior wall 82. As shown in FIGS. 6 and 7, interior wall 80 and exterior wall 82 are oriented generally tangentially to the bore 52 so as to receive the tangential tang 66. Consequently, the tang 66 is angularly fixed with respect to the body 42.

The second tang 68 of the locking band 44 extends partially into the slot 62, but is not constrained by the interior wall 80 and exterior wall 82, as shown in FIG. 7. The second tang 68 is normally free to rotate angularly relative to the body 42. However, as described below, the second tang 68 may contact exterior wall 82 during removal or counterclockwise rotation of the body 42, which limits the angular movement of the second tang 68 relative to the body 42.

Although illustrated as a single slot 62, the body 42 may instead define a combination of slots, recesses and/or surfaces to receive each of the tangs 66, 68.

Installation of the threaded fastener 40 in a first or generally clockwise direction onto the externally threaded member 45 expands the locking band 44, so that the locking band 44 does not interfere with or inhibit movement of the threaded fastener 40 onto the externally threaded member 45. However, rotation of the threaded fastener 40 in a removal or generally counterclockwise direction operates to draw the locking band 44 securely against the threads, whereby the threaded fastener 40 is effectively prevented from undesired, unintentional, or unexpected loosening, for example, due to vibration.

The locking band 44 allows desired loosening of the threaded fastener 40 if sufficient torque is applied to the body 42. When the body 42 is rotated in a second or counterclockwise direction with sufficient torque, the first tang 66, which is angularly constrained by the slot 62, may elastically deflect which in turn allows the nut to rotate through a small angle relative to the locking element 44. This rotation enables the second tang 68, which extends tangentially from the coil portion 70, to come into contact with the exterior wall 82 in the nut body 42. This contact reduces or potentially eliminates further increase in stress on the locking element as removal torque is applied to rotate the nut off the externally threaded member. Consequently, there is little or no damage to either the external thread or the locking element.

When removal torque is applied and the band elastically deflects, there is a small amount of sliding of the anchor tang 66 within the tangential slot 62. This freedom to move tangentially reduces or potentially eliminates tension in the band 44 and assures smooth wear-free operation over multiple reuses. When the lock nut is fully disengaged with the external thread, the band elastically returns to its original position.

The diameter of the locking band 44 may be selected so that a single locking band 44 may be used with all external thread classes within a particular thread size. It has been found that a single locking band 44 may "self-adjust" to accommodate various thread classes at least partially because the locking band 44 can slide within the slot 62. Alternatively, different locking bands 44 may be designed for use with different thread sizes, or different external thread classes within a particular thread size. Further, the cross-sectional shape, material strength, and elasticity of locking band 44 may be selected based on the desired application.

The body 42 and locking band 44 may be manufactured from any suitable material, including metals and composites. Additionally, because of the reduced stress in the locking band 44 during use of the threaded fastener 40, locking band 44 may be manufactured from relatively low-cost materials such as round steel wire. Installation of the locking band 44 can be accomplished in a number of ways. In the current embodiment, the diameter of the hole in the surface 64 is smaller than the diameter of the bore 56, which forms a shoulder for retaining the band. The band is installed by compressing it sufficiently to snap it into place under the shoulder. Alternatively, a separate plate could be used as a retainer. Further alternatively, the locking band 44 could be wound in place.

The locking torque can be a function of a number of variables, including initial diameter of the locking band, the material properties of the locking band, the coefficient of friction of the locking band, and the number of turns of the locking band. In addition, parameter tolerances will affect the range of locking torque for a particular configuration. Parameters for the locking band can therefore be selected for each thread size and tolerance range to allow the slip torque to be less than the ultimate strength of the locking band while still providing an acceptable locking torque range. In addition, the locking torque can be set to meet or to exceed relevant industry standards. The present locking threaded fastener includes a one-way prevailing torque, which may allow installation torque to be very low when compared to standard prevailing torque threaded fasteners. In addition, the locking band fastener removal prevailing torque is less subject to degradation over multiple uses when compared to a typical locking fastener.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A locking threaded fastener comprising:
   a fastener body, the fastener body defining a bore, the fastener body further defining a slot communicating with the bore, the slot being generally tangential to the bore and extending from the bore in only one direction from the point of tangency, the slot including an exterior wall; and
   a locking element including a coil portion and first and second tangs extending generally tangentially from the coil portion and into the slot, the locking element located within the bore, the second tang adapted to contact the exterior wall during loosening of the locking fastener.

2. The locking fastener of claim 1 wherein the first and second tangs are straight.

3. A locking threaded fastener comprising:

a fastener body defining a bore and a slot communicating with the bore, the slot being generally tangential to the bore and extending from the bore in only one direction from the point of tangency, the slot including an exterior wall, the fastener body being rotatable in a tightening direction and an opposite loosening direction; and a locking band including a coil portion within the bore and first and second tangs extending generally tangentially from the curved portion and into the slot, the first tang angularly fixed with respect to the fastener body, the second tang having a range of angular movement with respect to the fastener body, the second tang is adapted to contact the exterior wall during rotation of the locking fastener in the loosening direction.

4. The locking fastener of claim 3 wherein the first and second tangs overlap.

5. A locking threaded fastener comprising:

a fastener body defining a bore having a threaded portion and an unthreaded portion, the fastener body further defining a slot communicating with the bore, the slot being generally tangential to the bore and extending from the bore in only one direction from the point of tangency, the slot including an exterior wall, the fastener body being rotatable in a first tightening direction and a second loosening direction; and a locking band including a coil portion and first and second tangs extending generally tangentially from the coil portion and into the slot, the coil portion located within the unthreaded portion of the bore, the first tang limiting angular movement of the first tang with respect to the fastener body, the second tang adapted to contact the exterior wall during rotation of the fastener body in the second loosening direction.

6. The locking threaded fastener of claim 5 wherein the first tang is elastically deflectable.

\* \* \* \* \*